US008938760B1

(12) United States Patent
Yang et al.

(10) Patent No.: US 8,938,760 B1
(45) Date of Patent: Jan. 20, 2015

(54) TELEVISION BOX AND METHOD FOR CONTROLLING DISPLAY TO DISPLAY AUDIO/VIDEO INFORMATION

(71) Applicant: Browan Communications Inc., New Taipei (TW)

(72) Inventors: Cheng-Jen Yang, Hsinchu County (TW); Hung-Wen Chen, Hsinchu County (TW)

(73) Assignee: Browan Communications Inc., Banqiao District, New Taipei (TW)

( * ) Notice: Subject to any disclaimer, the term of this patent is extended or adjusted under 35 U.S.C. 154(b) by 0 days.

(21) Appl. No.: 14/047,025

(22) Filed: Oct. 7, 2013

(30) Foreign Application Priority Data

Aug. 1, 2013 (TW) .............................. 102127602 A (51) Int. Cl.
| | | |
|---|---|---|
| *G06F 3/00* | (2006.01) | |
| *G06F 13/00* | (2006.01) | |
| *H04N 5/445* | (2011.01) | |
| *H04N 21/482* | (2011.01) | |
| *H04N 21/475* | (2011.01) | |

(52) U.S. Cl.
CPC ....... *H04N 21/4823* (2013.01); *H04N 21/4753* (2013.01)
USPC .................. 725/46; 725/30; 725/37; 725/38; 725/39; 725/40; 725/43; 725/44; 725/45; 725/47; 725/56; 725/93; 725/109; 725/111; 725/112; 725/116; 725/117; 725/120; 725/131; 725/136; 348/553; 348/555; 348/563; 348/680; 348/693; 348/719; 348/723; 348/725; 348/730; 348/731; 348/734

(58) Field of Classification Search
USPC .............. 725/46, 47, 87, 109, 110, 112, 120, 725/131, 136, 39, 40, 41, 43, 44, 45, 30, 37, 725/38, 56, 93, 111, 116, 117; 348/734, 348/569, 563, 553, 555, 680, 693, 719, 723, 348/725, 730, 731
See application file for complete search history.

(56) References Cited

U.S. PATENT DOCUMENTS

| | | | |
|---|---|---|---|
| 8,261,303 B2 * | 9/2012 | Bae et al. ......................... 725/46 |
| 2002/0101540 A1 * | 8/2002 | Takagi et al. .................. 348/553 |
| 2006/0234677 A1 * | 10/2006 | Lin et al. ........................ 455/411 |
| 2006/0248568 A1 * | 11/2006 | Hamuz-Cohen et al. ..... 725/132 |
| 2007/0124788 A1 * | 5/2007 | Wittkoter ...................... 725/112 |
| 2008/0134275 A1 * | 6/2008 | Iketo .............................. 725/131 |
| 2008/0263596 A1 * | 10/2008 | Kim et al. ........................ 725/40 |
| 2010/0027806 A1 * | 2/2010 | Heine et al. .................. 381/73.1 |
| 2011/0138416 A1 * | 6/2011 | Kang et al. ...................... 725/39 |
| 2013/0033643 A1 * | 2/2013 | Kim et al. ..................... 348/563 |
| 2013/0033644 A1 * | 2/2013 | Kim et al. ..................... 348/563 |
| 2013/0033649 A1 * | 2/2013 | Kim et al. ..................... 348/734 |

(Continued)

*Primary Examiner* — Jefferey Harold
*Assistant Examiner* — Mustafizur Rahman
(74) *Attorney, Agent, or Firm* — Winston Hsu; Scott Margo (57) ABSTRACT

The present invention provides a TV box, where the TV box is connected to a display via lined connection or wireless connection, and the TV box includes a control unit, a network interface circuit and an output unit. The control unit connects to a first external server and an audio/video source via the network interface circuit, the control unit obtains a channel list from the first external server, and obtain audio/video information from the audio/video source by referring to a user inputted command and the channel list, where contents of the channel list is allowed to be edited by a user, and the control unit transmits the audio/video information to the display via the output unit.

11 Claims, 9 Drawing Sheets

(56) References Cited

U.S. PATENT DOCUMENTS

2013/0035941 A1* 2/2013 Kim et al. .................... 704/275
2013/0035942 A1* 2/2013 Kim et al. .................... 704/275
2013/0076990 A1* 3/2013 Kim et al. .................... 348/734

* cited by examiner

TELEVISION BOX AND METHOD FOR CONTROLLING DISPLAY TO DISPLAY AUDIO/VIDEO INFORMATION

BACKGROUND OF THE INVENTION

1. Field of the Invention

The present invention relates to a television (TV) box, and more particularly, to a TV box, and a method for controlling a display to display audio/video information according to a channel list edited by a user.

2. Description of the Prior Art

The present smart TV is a TV designed as a computer. When a user uses the smart TV to watch video programs on Internet, such as video on Youtube, the user requires to use a complicated designed remote controller, tablet computer or smart phone to input a domain name (i.e. Uniform Resource Locator (URL)) to a TV box. However, the user will spend much time searching the video program, causing inconvenience to the user. In addition, when the user is an old person, it is more inconvenient because he/she may not understand how to use the smart TV and network function and his/her learning speed and learning capacity are worsened.

SUMMARY OF THE INVENTION

It is therefore an objective of the present invention to provide a TV box and a method for controlling a display to display audio-video information, where the TV box can provide audio/video information to a TV according to a channel list edited by a user, and the user can use a conventional TV control method to select the channel/program, to solve the above-mentioned problem.

According to one embodiment of the present invention, a TV box is provided, where the TV box is connected to a display via lined connection or wireless connection, and the TV box comprises a control unit, a network interface circuit and an output unit. The control unit connects to a first external server and an audio/video source via the network interface circuit, the control unit obtains a channel list from the first external server, and obtain audio/video information from the audio/video source by referring to a user inputted command and the channel list, where contents of the channel list is allowed to be edited by a user, and the control unit transmits the audio/video information to the display via the output unit.

According to another embodiment of the present invention, a method for controlling a display to display audio-video information is provided, where the method is applied to a TV box, and the TV box is connected to the display via lined connection or wireless connection. The method comprises: connecting to a first external server and an audio/video source; obtaining a channel list from the first external server, and obtaining the audio/video information from the audio/video source by referring to a user inputted command and the channel list, wherein the channel list is able to be edited by a user; and transmitting the audio/video information to the display to display the audio/video information.

According to one embodiment of the present invention, a TV box is provided, where the TV box is connected to a display via lined connection or wireless connection, and the TV box comprises a control unit, a network interface circuit and an output unit. The control unit connects to an audio/video source via the network interface circuit, the control unit obtains a channel list, and the control unit obtains audio/video information from the audio/video source by referring to a user inputted command and the channel list, where the channel list is able to be edited by a user; and the control unit transmits the audio/video information to the display via the output unit, where the channel list is stored in the TV box, and contents of the channel list is allowed to be edited by a user.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
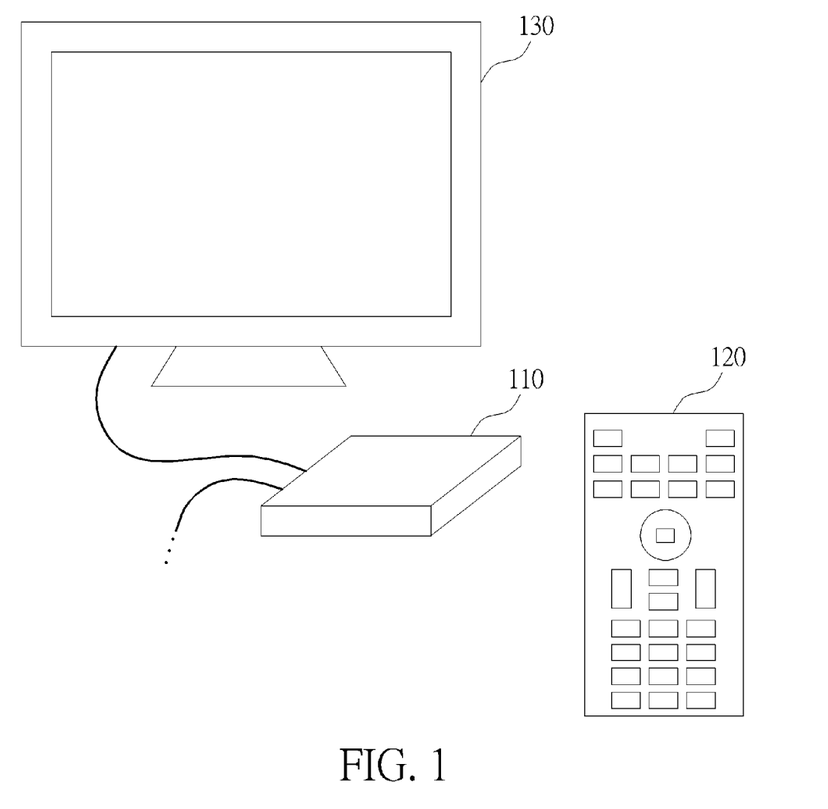
FIG. 1 is a diagram illustrating a TV box and remote controller set according to one embodiment of the present invention.

Please refer to FIG. 1, which is a diagram illustrating a TV box and remote controller set according to one embodiment of the present invention. As shown in FIG. 1, the TV box and remote controller set comprises a TV box 110 and a remote controller 120, where the TV box 110 is connected to a display (in this embodiment, the display is a TV 130, but it is not a limitation of the present invention) via lined connection or wireless connection. The TV box 110 has an operating system and network connections. By connecting the TV box 110 to the TV 130, the TV box 110 can receive audio/video information via Internet, and the audio/video information is transmitted to the TV 130 to be displayed thereon.

Figure 2:
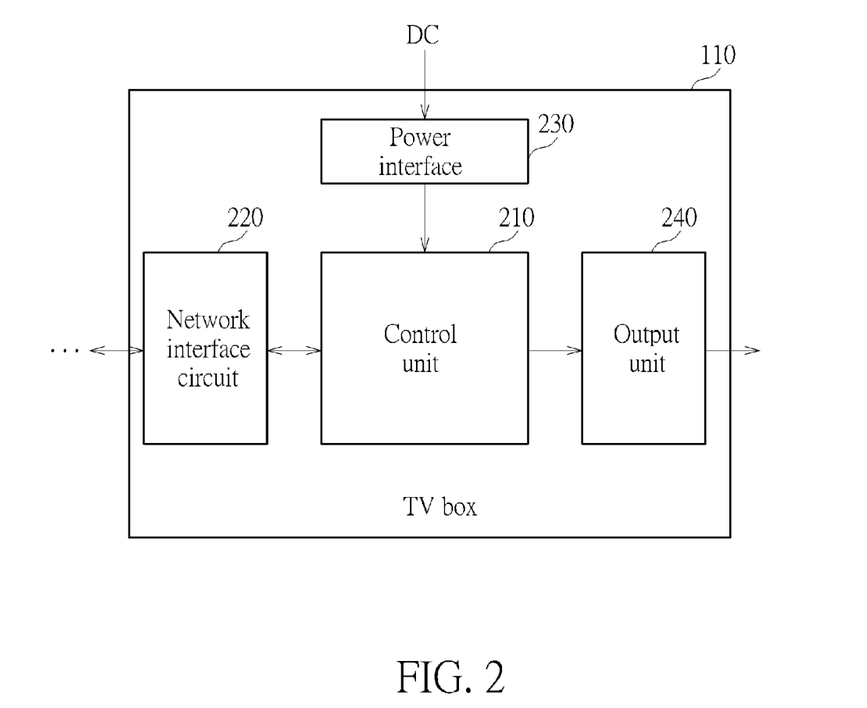
FIG. 2 is a diagram illustrating a TV box according to one embodiment of the present invention.

Please refer to FIG. 2, which is a diagram illustrating the TV box 110 according to one embodiment of the present invention. As shown in FIG. 2, the TV box 110 comprises a control unit 210, a network interface circuit 220, a power interface 230 and an output unit 240, where the control unit 210 can be implemented by one or more chip sets and/or other associated circuit elements, and the control unit 210 is used to control the main operations of the TV box 110. The network interface circuit 220 is used to connect to Internet by Wi-Fi or other network connecting method, and the control unit 210 is connected to Internet via the network interface circuit 220. The power interface 230 is connected to an external power, and is used to receive a DC voltage to generate a supply voltage to the elements of the TV box 110. The output unit 240 can be a Universal Serial Bus (USB) interface circuit, or a High-Definition Multimedia Interface (HDMI) interface circuit, where the control unit 210 can send the audio/video information to the TV 130 via the output unit 240.

Figure 3:
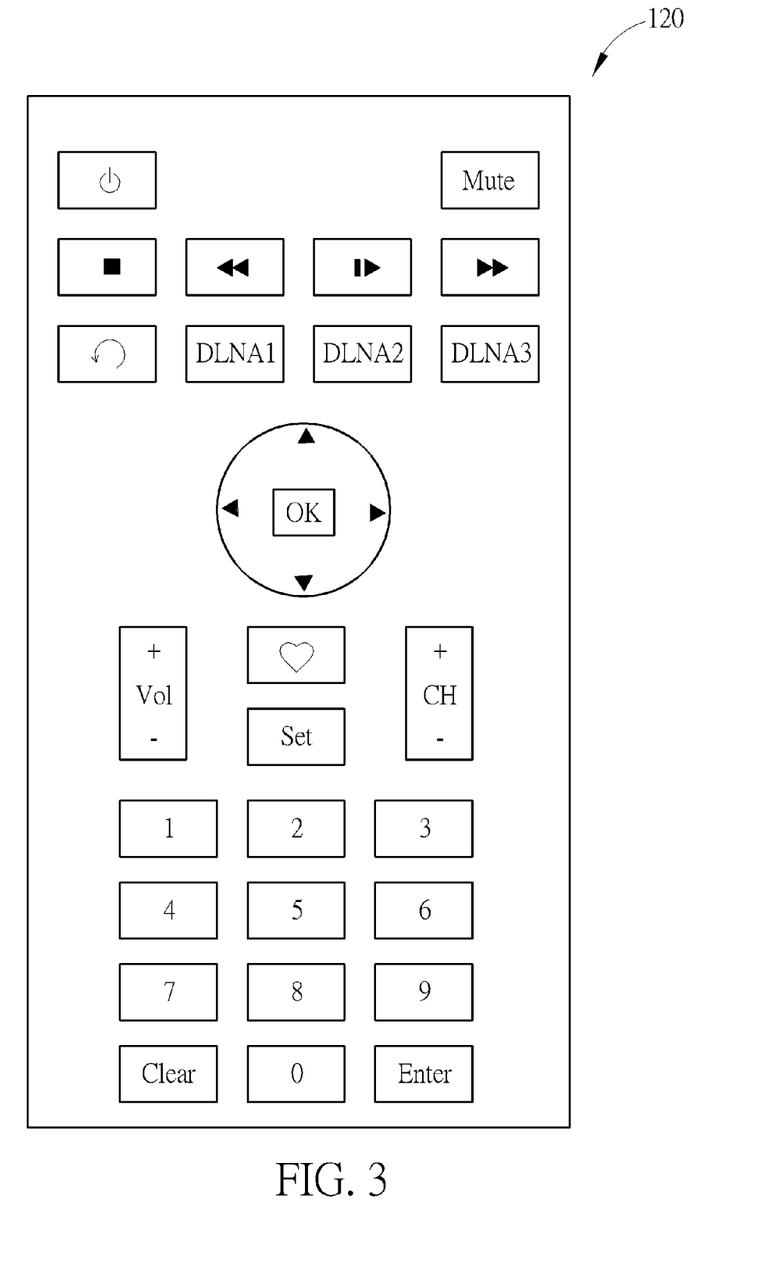
FIG. 3 is a diagram illustrating a remote controller according to one embodiment of the present invention.

Please refer to FIG. 3, which is a diagram illustrating the remote controller 120 according to one embodiment of the present invention. It is noted that the remote controller 120 shown in FIG. 3 is merely an example, and is not a limitation of the present invention. A person skilled in this art can understand that the button positions of the remote controller 120 shown in FIG. 3 can be adjusted according to designer's requirements, and one or more buttons can be added into or removed from the remote controller 120. Referring to FIG. 3, a control panel of the remote controller 120 comprises a power button, a mute button, a plurality of set buttons, a channel select button, a volume control button, Digital Living Network Alliance (DLNA) switch buttons (DLNA1, DLNA2 and DLNA3 of FIG. 3 are used for switching to DLNA video, DLNA picture and DLNA music, respectively), and a plurality of digital buttons. Functions of the buttons of the remote controller 120 shown in FIG. 3 are similar to that of a conventional TV remote controller, a person skilled in this art should understand the functions of these buttons, and the detailed operations of the remote controller 120 are therefore omitted here. In addition, in one embodiment of the present invention, the remote controller 120 does not include any mouse control function, and the remote controller 120 does not have any alphabet button.

Figure 4:
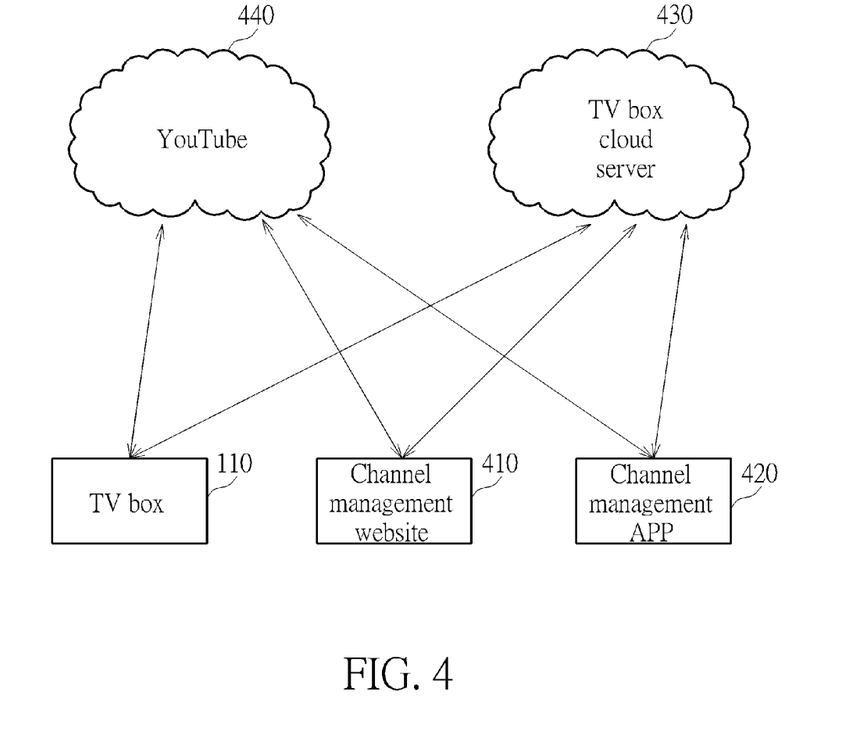
FIG. 4 is a diagram illustrating using the TV box to control the TV to display audio/video information according to one embodiment of the present invention.

Please refer to FIG. 4, which is a diagram illustrating using the TV box 110 to control the TV 130 to display audio/video information according to one embodiment of the present invention. As shown in FIG. 4, a channel management website 410 is provided by a TV box cloud server 430, and the channel management website 410 is for a user to edit contents of channels, and the user may use a personal computer (e.g. desktop computer, notebook, tablet computer or any other device that can connect to Internet via network device) to the channel management website 410. The function of a channel management application (APP) 420 is similar to the function of the channel management website 410, that is used to edit the contents of the channels by the user using the smart phone having the channel list APP 420. In addition, the TV box 110 can obtain audio/video information from YouTube 440 according to the channel contents edited by the user in the channel management website 410. It is noted that the YouTube 440 shown in FIG. 4 is for illustrative purposes only, in practice, the YouTube 440 shown in FIG. 4 can be replaced by any other audio/video provider, and the TV box 110 can obtain the audio/video information from the other audio/video provider according to the channel contents edited by the user in the channel management website 410. These alternative designs shall fall within the scope of the present invention.

Figure 5:
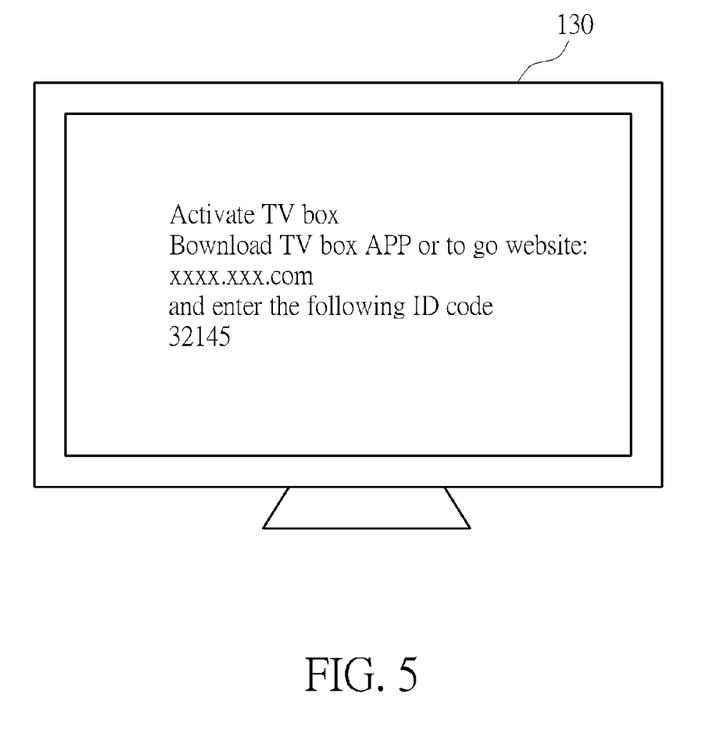
FIG. 5 is a diagram showing contents of a screen of the TV when TV box is connected to the TV for the first time.

Please refer to FIGS. 1-4 together, first, when a user connects the TV box 110 to the TV 130 for the first time, the TV box 110 transmits an identification (ID) code to the TV 130, where the ID code is for confirming an identity of the TV box 130, and each TV box 110 has its unique ID code. For example, FIG. 5 shows the contents on a screen of the TV 130.

In this embodiment, the TV 130 receives the ID code and displays this ID code only when the TV box 110 is connected to the TV 130 for the first time. That is, in the follow-up operations, the TV 110 will not transmit the ID code to the TV 130.

Then, the user enters the channel management website 410 or uses a smart phone to download the channel management APP 420 to prepare to enter the TV box cloud server 430. During the process of login the TV box cloud server 430, the user needs to input the ID code shown in FIG. 5 into the TV box cloud server 430 to edit a channel list, and the edited channel list is stored into the TV box cloud server 430. In addition, in the present embodiment, not only the ID code shown in FIG. 5, the user also needs to key in a user ID and its password for the YouTube 440 to allow the TV box 110 obtain a private video/audio from the YouTube 440. When the user enters the TV box cloud server 430, the TV box in the follow-up operations can automatically communicate with the TV box cloud server 430, and the TV box cloud server 430 will store the user ID and its password for the YouTube 440 into a memory of the TV box 110.

At this time, the TV box 110 can transmit a Wi-Fi setting picture to the TV 130 to allow the user to set the Wi-Fi function of the TV box 110.

Figure 6A:
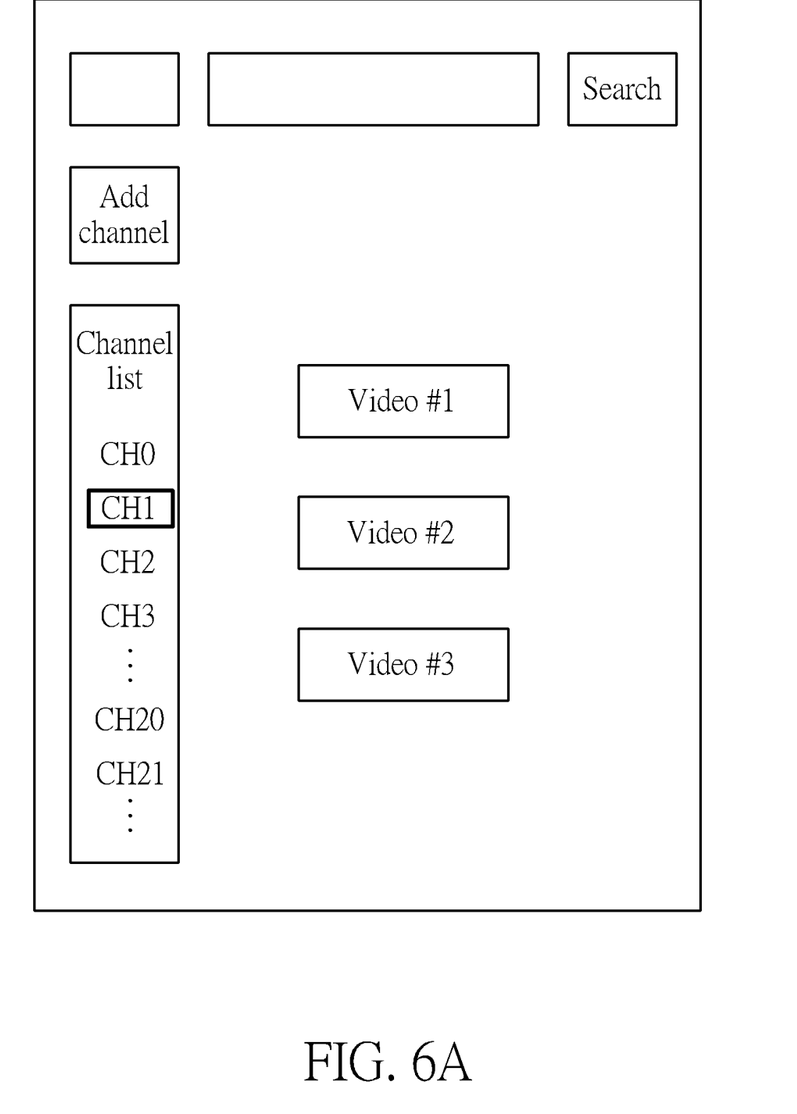
FIGS. 6A-6C are web pages of the channel management website or the channel management APP according to one embodiment of the present invention.
Figure 6B:
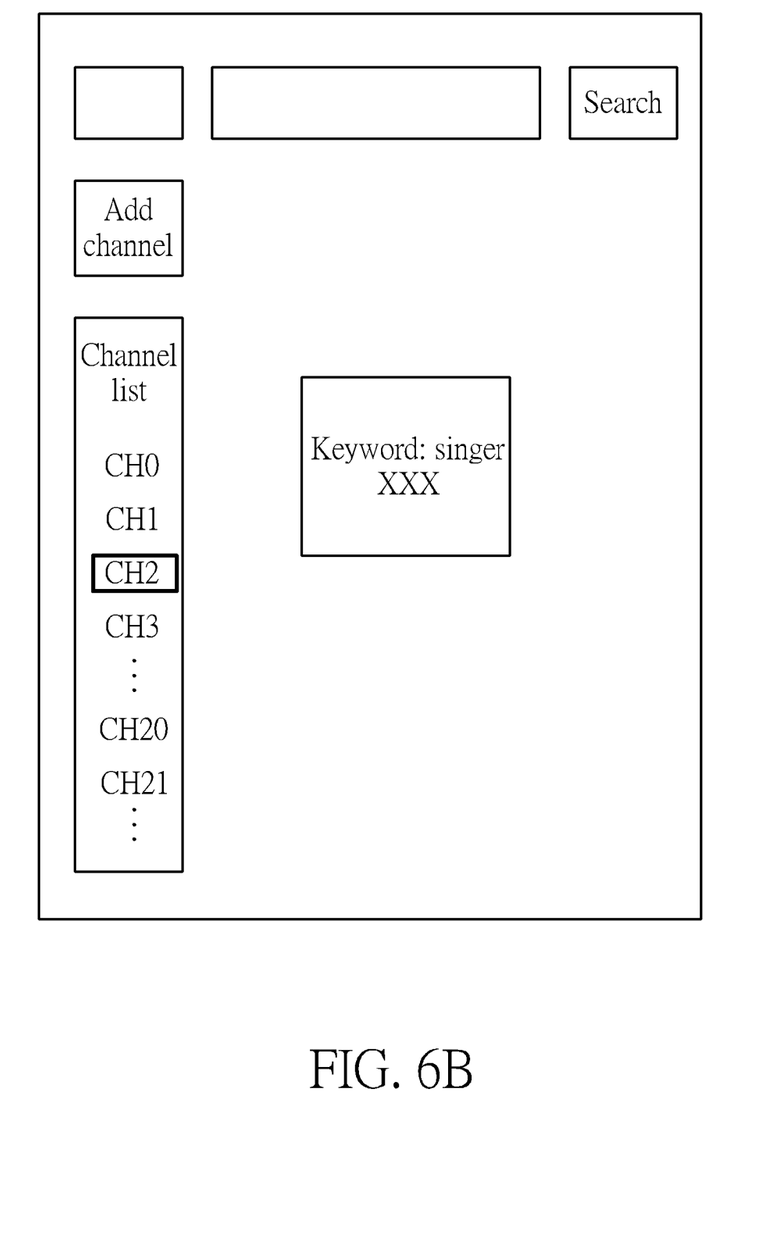
Figure 6C:
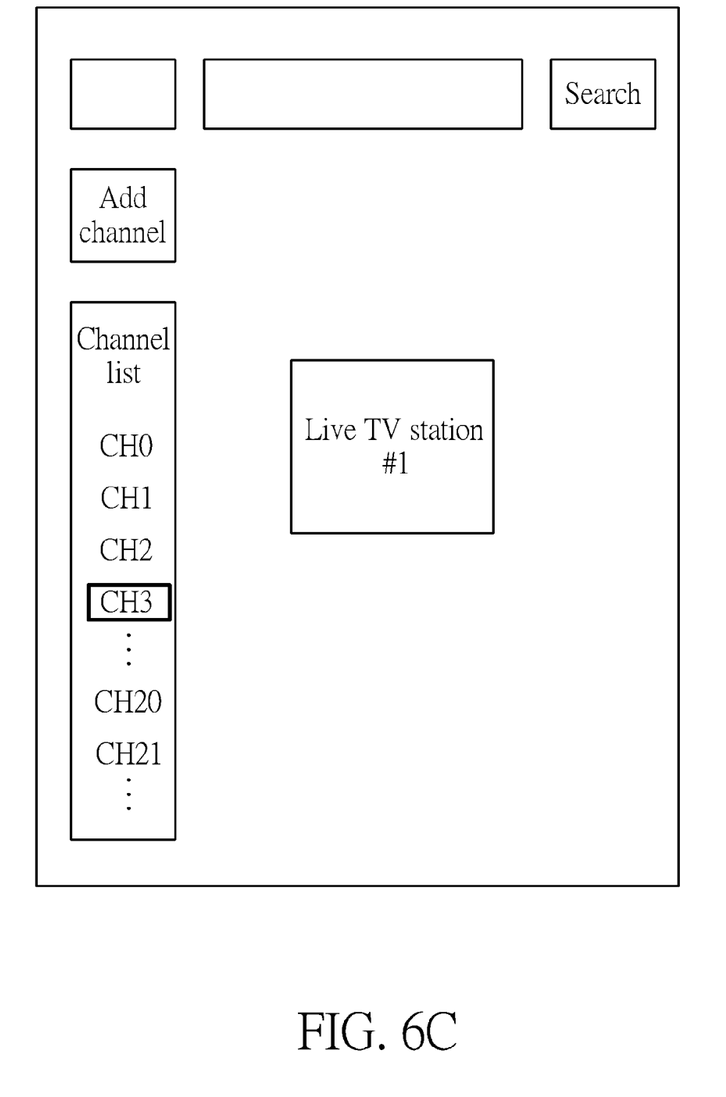

The channel list edition and further operations of the TV box 110 are described as follow. Please refer to FIGS. 6A-6C, which are web pages of the channel management website 410 or the channel management APP 420 according to one embodiment of the present invention. It is noted that FIGS. 6A-6C are for illustrative purposes only, the web pages of the channel management website 410 or the channel management APP 420 can have other designs. In FIG. 6A, the user can edit a first channel CH1 to add videos (e.g., video #1 to video #3 in the figure), where these videos can be public videos on the YouTube 440 or private videos the user uploaded to the YouTube 440. In FIG. 6B, the user can edit a second channel CH2 to define a keyword to be searched. In FIG. 6C, the user can edit a third channel to add a live TV station #1.

In another embodiment, the user can edit a channel to add an online game server; or the user can edit a channel to add a specific audio/video source, where the specific audio/video source can be video data stored in a USB mass storage connected to the TV box 110, or DLNA video, DLNA picture and DLNA music in the same local network.

In addition, the channel list may reserve several channels to a manufacturer of the TV box 110 and the TV box cloud server 430. For example, the $20^{th}$ to $30^{th}$ channels of the channel list can be locked to be edited by the user, and the manufacturer of the TV box 110 and the TV box cloud server 430 can set the programs of the $20^{th}$ to $30^{th}$ channels.

After the user edits the channel list, the edited channel list is stored into the TV box cloud server 430. Then, when the user connects the TV box 110 to the TV 130 and uses the TV box 110 to watch the programs of the channel previously edited, the TV box 110 will automatically connect to the TV box cloud server 430 via Internet to obtain the channel list previously edited, and the TV box 110 refers to the channel list to obtain audio/video information from a server via Internet according to a user inputted command. In detail, when the user uses the remote controller 120 to select the first channel CH1, the TV box 110 will automatically connect to the YouTube 440 to obtain the video #1 and transmit the video #1 to the TV 130 to be displayed. After the display of the video #1 is finished, the TV box 110 will automatically connect to the YouTube 440 to obtain the video #2 and transmit the video #2 to the TV 130 to be displayed; and after the display of the video #2 is finished, the TV box 110 will automatically connect to the YouTube 440 to obtain the video #3 and transmit the video #3 to the TV 130 to be displayed. In addition, the user may use the buttons on the remote controller 120 to select one of the videos #1-#3. In addition, because the TV box 110 stores the user ID and password for the YouTube 440, even one of the videos #1-#3 is a private video (i.e., not public to the others) the TV box 110 can obtain the audio/video information from the YouTube 440. In addition, when the user uses the remote controller 120 to select the second channel CH2, the TV box 110 will transmit the keyword, such as a singer "XXX", to the YouTube 440 to search the public videos related to the singer "XXX", and the TV 130 will show the searching result of the keyword, and the user can use the arrow buttons of the remote controller 120 to select the video. In addition, when the user uses the remote controller 120 to select the third channel CH3, the TV box 110 will directly connect to a website of the live TV station #1 to allow the user to watch the live TV program on the TV 130, where the website of the live TV station #1 can be in the YouTube 440 or in another external server. In addition, when the user uses the remote controller 120 to select a channel, where the channel is connected to an online game server, the user can uses a game controller (e.g. a joystick) to play games, where the game controller is connected to a USB port of the TV box 110. In addition, when the user uses the remote controller 120 to select a channel, where the channel is directed to video data of the USB mass storage or DLNA video, DLNA picture and DLNA music in the same local network, the TV box 110 will directly obtain the video data of the USB mass storage or DLNA video, DLNA picture and DLNA music in the same local network, and display the audio/video information on the TV 130, for allowing the user to select the required contents.

In light of above, because the TV box 110 obtains the audio/video information from the YouTube 440 or other audio/video providers by referring to the edited channel list, the user can use a simple designed remote controller 120 to select the video he/she wants to watch, and the user does not need to key in the keyword to search the videos. Therefore, the user may feel comfortable when watching TV. Particular, when the user is an old person who does not understand how to use the smart TV and network function, his/her family members or friends may help to edit the channel list, and the old person can easily use the remote controller 120 to select the video he/she wants to watch.

In addition, when the user needs to stop watching the audio/video information, when the audio/video information displayed on the TV 130 is interrupted, the TV box 110 can use a digital tab to mark an interrupted point of the audio/video information, and the digital tab is stored in the TV box 110 or the TV box cloud server 430. Therefore, next time the user can directly watch the audio/video information from the interrupted point, without wasting time finding the interrupted point.

In this embodiment, the user uses the user ID and password for the YouTube 440 to login the TV box cloud server 430, and the TV box 110 stores the user ID and password, and TV box 110 uses the user ID and password to login the YouTube 440 to obtain the audio/video information. The above-mentioned techniques can be achieved by using the OpenID and Open Authentication (OAuth) standards. Because a person skilled in this art should understand how to use theses techniques to implement the detailed operations of the present invention, further descriptions are therefore omitted here.

In this embodiment, the TV box 110 can only record one user ID and password for the YouTube 440. That is, once the user uses the ID code of the TV box 110 and the user ID and password for the YouTube 440 to login the TV box cloud server 430, the user cannot modify the user ID and password stored in the TV box 110. In addition, several different TV boxes can record one set of user ID and password for the YouTube 440.

In addition, because the TV box 110 can obtain the private video uploaded by the user, the user can also prevent the TV box 110 from accessing the channel list stored in the TV box cloud server 430 by entering the TV box cloud server 430 to change the setting.

Figure 7:
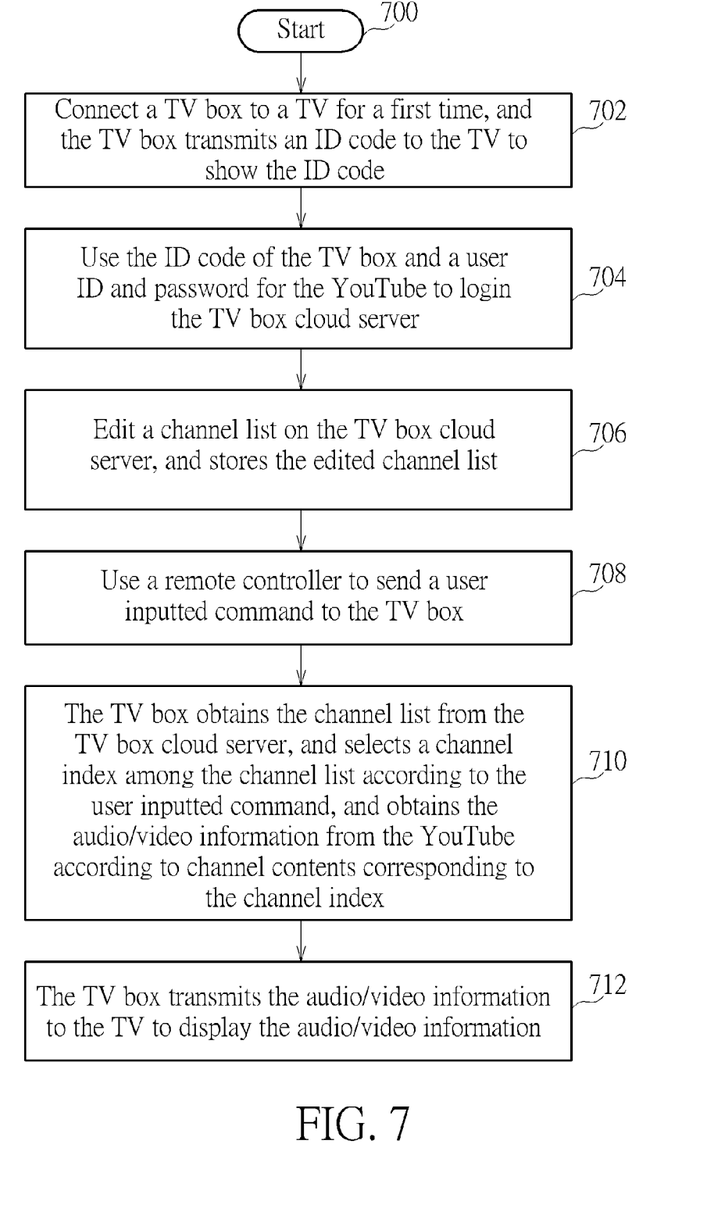
FIG. 7 shows a flowchart of a method for using the TV box to control the TV to display audio/video information according to one embodiment of the present invention.

FIG. 7 shows a flowchart of a method for using the TV box 110 to control the TV 130 to display audio/video information according to one embodiment of the present invention. Referring to FIG. 7 and the above-mentioned disclosure, the flow is described as follow:

Step 700: the flow starts.

Step 702: a user connects the TV box 110 to the TV 130 for the first time, and the TV box 110 transmits an ID code to the TV 130 to show the ID code on the TV 130.

Step 704: the user uses the ID code of the TV box 110 and a user ID and password for the YouTube 440 to login the TV box cloud server 430, and the TV box 110 stores the user ID and password for the YouTube 440.

Step 706: the user edits a channel list on the TV box cloud server 430, and stores the edited channel list.

Step 708: the user uses a remote controller 120 to send a user inputted command to the TV box 110 (i.e., the user uses the remote controller 120 to select a channel).

Step 710: the TV box 110 obtains the channel list from the TV box cloud server 430, and selects a channel index among the channel list according to the user inputted command, and obtains the audio/video information from the YouTube 440 according to channel contents corresponding to the channel index.

Step 712: the TV box 110 transmits the audio/video information to the TV 130 to display the audio/video information.

In the above-mentioned embodiment, the edited channel list is stored in the TV box cloud server 430. In another embodiment, however, the channel list can be stored into the TV box 110 simultaneously. Therefore, when the TV box cloud server 430 cannot be reached (may be failed), or the user cannot connect to the TV box cloud server 430 due to internet problems, the user still can use the channel list stored in the TV box 110 to connect to the external server, USB mass storage, or DLNA video, DLNA picture and DLNA music in the same local network to obtain audio/video information.

In addition, in another embodiment of the present invention, considering the problems such as the TV box cloud server 430 cannot be reached or the user cannot connect to the TV box cloud server 430 due to internet problems, the functions of the TV box cloud server 430 can be built in the TV box 110, that is the TV box 110 can be operated as a small server. In detail, when the user needs to edit the channel list, the user can use a smart phone having the channel management APP 420 to edit the channel list stored in the TV box 110, and the edited channel list is directly stored into the TV box 110, and the following operations of the TV 110 can refer to the above-mentioned disclosure. Because a person skilled in this art should understand how to design and manufacture the TV 110 to have the functions of the TV box cloud server 430, and a person skilled in this art should understand the detailed operations and embodiments of the TV 110 having the functions of the TV box cloud server 430 after reading the above-mentioned descriptions related to FIGS. 1-7, further descriptions are therefore omitted here.

Briefly summarized, in the TV box, TV box and remote controller set and the method for controlling the display to display audio-video information of the present invention, the user can edit the channel list in the TV box cloud server 430, and the TV 110 can automatically obtain the channel list from the TV box cloud server 430, and obtain the audio/video information from the YouTube 440 according a channel selected by the user using the remote controller. Therefore, the user can easily select the video he/she wants to watch, and the user will feel free and comfortable when watching the TV 130.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A television (TV) box, connected to a display via lined connection or wireless connection, comprising:
    a control unit;
    a network interface circuit, coupled to the control unit, wherein the control unit connects to a first external server and an audio/video source via the network interface circuit, the control unit obtains a channel list from the first external server, and obtains audio/video information from the audio/video source by referring to a user inputted command and the channel list, where contents of the channel list is allowed to be edited by a user; and
    an output unit, coupled to the control unit, wherein the control unit transmits the audio/video information to the display via the output unit;
    wherein the audio/video source is a second external server, and when the TV box is connected to the display for a first time, the control unit transmits an identification code to the display to show the identification code, where the identification code is for a user to login the first external server and edit the channel list.

2. The TV box of claim 1, wherein the control unit records a user identification and a password inputted by a user when the user logins the first external server, and the control unit uses the user identification and the password to login the second external server.

3. The TV box of claim 2, wherein after the control unit records the user identification and the password, the control unit does not use any other user identification and password to login the second external server.

4. The TV box of claim 1, wherein when the audio/video information displayed on the display is interrupted, the control unit uses a digital tab to mark an interrupted point of the audio/video information, and the control unit stores the digital tab into the TV box or the first external server.

5. The TV box of claim 1, wherein the channel list comprises a plurality of channel indexes and their corresponding channel contents, and the control unit selects a channel index among the channel list according to the user inputted command, and obtains the audio/video information from the second external server according to the channel content corresponding to the selected channel index.

6. A method for controlling a display to display audio-video information, wherein the method is applied to a television (TV) box, and the TV box is connected to the display via lined connection or wireless connection, the method comprising:
    connecting to a first external server and an audio/video source;
    obtaining a channel list from the first external server, and obtaining the audio/video information from the audio/video source by referring to a user inputted command and the channel list, wherein the channel list is able to be edited by a user;
    transmitting the audio/video information to the display to display the audio/video information;
    when the TV box is connected to the display for a first time, the TV box transmits an identification code to the display to show the identification code, where the identification code is for a user to login the first external server and edit the channel list.

7. The method of claim 6, wherein the audio/video source is a second external server, and the method further comprising:
    recording a user identification and a password inputted by a user when the user logins the first external server, and using the user identification and the password to login the second external server.

8. The method of claim 7, further comprising:
    after recording the user identification and the password, not using any other user identification and password to login the second external server.

9. The method of claim 6, wherein the channel list comprises a plurality of channel indexes and their corresponding channel contents, and the step of obtaining the channel list from the first external server, and obtaining the audio/video information from the second external server by referring to the user inputted command and the channel list comprises:
    selecting a channel index among the channel list according to the user inputted command, and obtaining the audio/video information from the second external server according to the channel content corresponding to the selected channel index.

10. A television (TV) box, connected to a display via lined connection or wireless connection, comprising:
    a control unit;
    a network interface circuit, coupled to the control unit, wherein the control unit connects to an audio/video source via the network interface circuit, the control unit obtains a channel list, and the control unit obtains audio/video information from the audio/video source by referring to a user inputted command and the channel list, where the channel list is able to be edited by a user; and
    an output unit, coupled to the control unit, wherein the control unit transmits the audio/video information to the display via the output unit;
    wherein the channel list is stored in the TV box, and the channel list stored in the TV box is allowed to be edited by a user using a smart phone having a channel management application.

11. The TV box of claim 10, wherein the channel list is also stored in an external server, and the channel list stored in the external server is allowed to be edited by the user using the smart phone having the channel management application.

* * * * *